United States Patent
Striem Amit (10) Patent No.: US 9,679,131 B2
(45) Date of Patent: Jun. 13, 2017

(54) METHOD AND APPARATUS FOR COMPUTER INTRUSION DETECTION

(71) Applicant: Cybereason Inc, Wilmington, DE (US)

(72) Inventor: Yonatan Striem Amit, Gedera (IL)

(73) Assignee: Cybereason Inc., Boston, MA (US)

( * ) Notice: Subject to any disclaimer, the term of this patent is extended or adjusted under 35 U.S.C. 154(b) by 123 days.

(21) Appl. No.: 13/826,821

(22) Filed: Mar. 14, 2013

(65) Prior Publication Data

US 2014/0215618 A1     Jul. 31, 2014

Related U.S. Application Data (60) Provisional application No. 61/756,478, filed on Jan. 25, 2013.

(51) Int. Cl.
| | | |
|---|---|---|
| G06F 11/00 | (2006.01) | |
| G06F 12/14 | (2006.01) | |
| G06F 12/16 | (2006.01) | |
| G08B 23/00 | (2006.01) | |
| G06F 21/55 | (2013.01) | |
| H04L 29/06 | (2006.01) | |

(52) U.S. Cl.
CPC ............ *G06F 21/55* (2013.01); *G06F 21/552* (2013.01); *H04L 63/1425* (2013.01)

(58) Field of Classification Search
USPC .............................................. 726/23, 24, 25
See application file for complete search history.

(56) References Cited

U.S. PATENT DOCUMENTS

| | | | | |
|---|---|---|---|---|
| 8,510,432 B2* | 8/2013 | Bhattacharya | ........ | H04L 41/069 709/224 |
| 2008/0059474 A1* | 3/2008 | Lim | ................... | G06F 17/3089 |
| 2009/0138592 A1* | 5/2009 | Overcash | ............ | H04L 63/1425 709/224 |
| 2009/0172821 A1* | 7/2009 | Daira | ...................... | G06F 21/55 726/27 |
| 2012/0167162 A1* | 6/2012 | Raleigh | .................... | G06F 21/57 726/1 |
| 2013/0055399 A1* | 2/2013 | Zaitsev | ............... | H04L 63/1416 726/25 |
| 2013/0097701 A1* | 4/2013 | Moyle | ................... | G06F 21/552 726/22 |
| 2013/0326623 A1* | 12/2013 | Kruglick | ............. | H04L 63/1416 726/23 |
| 2014/0165140 A1* | 6/2014 | Singla | ................. | G06F 11/3006 726/1 |
| 2014/0165189 A1* | 6/2014 | Foley | ...................... | H04L 63/14 726/22 |

* cited by examiner

*Primary Examiner* — Carl Colin
*Assistant Examiner* — Quy Pham
(74) *Attorney, Agent, or Firm* — Flachsbart & Greenspoon, LLC (57) ABSTRACT

A method and apparatus for intrusion detection, the method comprising: receiving a description of a computerized system, the description comprising two or more entities, one or more attribute for each entity and one or more statistical rule related to relationship between the entities; receiving data related to activity of the computerized system, the data comprising two or more events; grouping the events into two or more groups associated with the entities; comparing the groups in accordance with the statistical rule, to identify a group not complying with any of the statistical rules.

23 Claims, 3 Drawing Sheets

METHOD AND APPARATUS FOR COMPUTER INTRUSION DETECTION

TECHNICAL FIELD

The present disclosure relates to communicating with users of a computerized system in general, and to identifying intrusion or intrusion attempt to a computer, in particular.

BACKGROUND

Modern computerized systems all over the world are often threatened by intrusive attacks. Some attacks are targeted at a specific computer or network for a specific purpose, such as causing damage or collecting specific information. Other attacks, however, are more general and are targeted at a wide range of computers, networks and users.

Intrusion detection systems are constantly attempting to detect intrusive attacks and generate alerts whenever an intrusive attack is identified.

Typical intrusion detection systems are signature-based and/or protocol-analysis based. Such systems typically include a subset of: port assignment, port following, protocol tunneling detection, protocol analysis, Transmission Control Protocol (TCP) reassembly, flow assembly, statistical threshold analysis, pattern matching and the like.

Another aspect of protecting computer systems relates to preventing attacks. The optimal goal is of course to prevent the first attack. However, most of the current solutions first identify an attack and only then attempt to prevent it from causing further damage, thus leaving the network vulnerable to the first attack.

Some intrusion prevention systems may block a session or an IP address, if it is determined that the session is a part of an intrusive attack, or when intrusive attacks originate from the certain IP address.

A typical problem associated with intrusion detection and prevention relates to the tradeoff between false negative and false positive alerts and blocking. If the intrusion detection is too strict, it may identify legitimate activities as hazardous, activate prevention measures and disturb the normal work flow of a system, a user, or an organization. Too strict detection and prevention also requires more resources, such as computing time, computing power, storage, and others. Too tolerant detection, on the other hand, may miss malicious attacks and prove ineffective.

BRIEF SUMMARY

One exemplary embodiment of the disclosed subject matter is a computer-implemented method performed by a computerized device, comprising: receiving a description of a computerized system, the description comprising two or more entities, one or more attributes for each of the entities and one or more statistical rules related to relationship between the entities; receiving data related to activity of the computerized system, the data comprising two or more events; grouping the events into two or more groups associated with the entities; comparing the groups in accordance with the statistical rules, to identify a group not complying with any of the statistical rules. The method may further comprise generating an alert related to the group not complying with any of the statistical rules. The method may further comprise issuing the alert to a person in charge. The method may further comprise updating the description of the computerized system based on a reaction of an operator to the alert. The method may further comprise reconstructing the group not complying with the statistical rule. The method may further comprise aggregating each of the groups to obtain two or more objects, and wherein comparing the groups comprises comparing the objects. Within the method, aggregating any of groups may comprise an option selected from the group consisting of: counting items; averaging items; dividing an object sum by accumulated time; and dividing an object sum by time range. The method may further comprise a learning component for learning the data and updating the description of the computerized system based on the data. The method may further comprise: receiving definition of the entities; receiving one or more attributes for each of the entities; receiving one or more relationships between the entities; and receiving one or more statistical rules related to the relationship. Within the method, each of the entities is optionally selected from the group consisting of: a computer; an application; a process; a module; a user; an organizational unit; and a web site.

Another exemplary embodiment of the disclosed subject matter is an apparatus having a processing unit and a storage device, the apparatus comprising: a system receiving component for receiving a description of a computerized system, the description comprising two or more entities, one or more attribute for each of the entities and one or more statistical rules related to relationship between the entities; a data receiving component for data related to activity of the computerized system, the data comprising two or more events; a data division component for grouping the events into two or more groups associated with the entities; an aggregation component for aggregating each of the two or more groups to obtain two or more objects; and a group analysis component for comparing the objects in accordance with the statistical rules, to identify a group not complying with any of the statistical rules. The apparatus may further comprise an alert generation component for generating an alert related to the group not complying with the statistical rule. The apparatus may further comprise a reconstruction component for reconstructing the group not complying with the statistical rule. The apparatus may further comprise a learning component for learning the data and updating the description of the computerized system based on the data. Within the apparatus, the description is optionally updated based on a reaction of an operator to the alert. The apparatus may further comprise a system description module for: receiving definition of the entities; receiving one or more attributes for each of the entities; receiving one or more relationships between the entities; and receiving one or more statistical rules related to the relationship. Within the apparatus, each of entities is optionally selected from the group consisting of: a computer; an application; a process; a module; a user; an organizational unit; and a web site.

Yet another exemplary embodiment of the disclosed subject matter is a computer program product comprising: a non-transitory computer readable medium; a first program instruction for receiving a description of a computerized system, the description comprising two or more entities, one or more attribute for each of entities and one or more statistical rules related to relationship between the entities; a second program instruction for receiving data related to activity of the computerized system, the data comprising two or more events; a third program instruction for grouping the events into two or more groups associated with the entities; and a fourth program instruction for comparing the groups in accordance with the statistical rules, to identify a group not complying with any of the statistical rules, wherein said first, second, third and fourth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block or blocks of block diagrams.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the need to detect malicious activity in a computer system. The malicious activity should be detected without requiring a signature of the malicious activity, since that would generally expose the system to damages between the time attack begins and until it is first detected, its signature is recognized and it is blocked.

Another technical problem dealt with by the disclosed subject matter is the need for such system and method to be flexible and tailor-made to the different entities, configuration, activities and requirements in each part of each environment in which it is used. Activity that may seem suspicious in one part of an organization, such as assuming superior privileges for a computer, may be absolutely legitimate in another part of the organization such as in the IT department, or in a different organization.

One technical solution comprises the provisioning of a language, and a system and method for using the language to define entities, relationships between entities, and statistical measures, to be evaluated on data collected for the entities and relationships, in order to detect an intrusion or intrusion attempt. When data is later collected for the various entities during activity of the computer network, the statistical measures are evaluated, and alerts may be fired in accordance with suspicious events. The system may be provided as part of a general security system, comprising also data collection tools, intrusion prevention tools, and additional components.

Exemplary entities comprised in the language may include computers, processes, modules, threads, users, applications, web sites, databases or any other entity defined by a user, who may be an administrator, an IT professional, or the like. Each such entity may comprise one or more properties or attributes, such as a name, an owner, creation time, last modification time, last access time, physical location, permissions, location in a hierarchy such as a file hierarchy, or any other attribute. It will be appreciated that each entity type may have specific attributes which may be irrelevant for entities of other types. Also defined are interactions or relationships between entities. For example, an entity is comprised in another entity, a process may run on a computer, a web site may be accessed by a module, or the like.

The entities may be partitioned so that comparison between entities belonging to the same collection makes sense. For example, users at one department may be assumed to have similar needs, activate similar processes, access similar web sites, or the like. Thus, computers of people belonging to one organizational unit may be grouped together, and computers of people belonging to another organizational unit may be defined as a second group.

The system and method may also provide for defining attributes of objects and of relations between objects. For example, a particular module may be defined to always reside in memory, or a particular module A may be defined to always reside in memory whenever an object B is in memory.

The system and method may also provide for defining rules indicating relationships between entities during normal operation of the network, such that abnormal behaviors may be identified and alerts may be fired. For example, it may be expressed that a particular computer may run up to three instances of a particular process, while another computer may run up to 20 such instances.

Security threats may thus be defined by providing statistical queries related to the relationships, and a manner of evaluating the results. For example, a suspicious result may be defined by a deviation from a predetermined value, by high deviation from the values associated with comparable entities, or the like.

During operation, the system collects data in an ongoing manner. It will be appreciated that some data may be collected in a continuous manner, while other data items may be sampled at time intervals.

Using the collected data, the system and method may identify situations deviating from the normal behavior, or complying with hazardous situations, and may issue alerts for such situations. In some embodiments, the system and method may also take actions to prevent such situations, for example blocking websites, disconnecting users, or the like.

The system and method may also learn the legitimacy of different behaviors over time. For example, it may learn that computer A is highly likely to activate process B, such that activation of process B by another computer may raise alert, while activation by computer A will not.

Consider for example, an environment in which the system and method may collect interactions of type "Computer X is running Process Y which uses module Z" for multiple values of X, Y and Z. The input of the system includes one or more objects of type Computer, which is associated with one or more objects of type Process, which in turn are associated with one or more objects of type Module. Each interaction may be described as "Computer A→Process B→Module C.

A statistical query may be defined as: "compute the number of computers where any process uses any module, relatively to the number of computers where a process is running but does not use a module".

A statistical rule may associate a predetermined significance with each range of occurrences. For example, a common module may be present in 50-100% of the cases, while the presence of another module which is usually present only at 10% of the cases may raise suspicion.

In another example, a module may normally be found in 0-10% of the machines running a process, while higher frequency may be suspicious.

The system may then process all the events gathered over a period of time, determine for each computer and each process if it has or does not have a module, and calculate the statistics.

The system may then generate an alert for Process C and Module B on Computer A, if they deviate from the predetermined range.

It will be appreciated that the probabilities may be modified in a variety of ways. For example probabilities may be defined or modified explicitly by administrator's actions. Probabilities can also be modified over time, for example events can be given decaying weight so that if a user stops performing an action (such as assuming root privileges) over time, that action will become more unusual and hence would be assigned a higher probability of being suspect when detected. In some embodiments of time decaying, a rule may be defined which takes into account only interactions performed in the last predetermined period, such as 15 days.

One technical effect of the disclosure relates to providing a system and method for defining the entities, their attributes and relationships, and defining normal or abnormal behaviors for the particular system in a statistical manner. The definitions may be provided in an easy-to-use manner, and may express all aspects of the environment.

Another technical effect of the disclosure relates to issuing statistical queries related to data collected over time, wherein the responses to the queries may identify abnormal activity. The queries may be predefined and may be run in an automated manner. Additionally or alternatively, queries may be provided by a user in a particular situation, and may also cause the raising of an alert.

Yet another technical effect of the disclosure relates to the system and method learning the behavior of the entities, and identifying events as hazardous based on deviation from collected statistics and reactions to previous alerts, rather than from defined queries.

Figure 1:
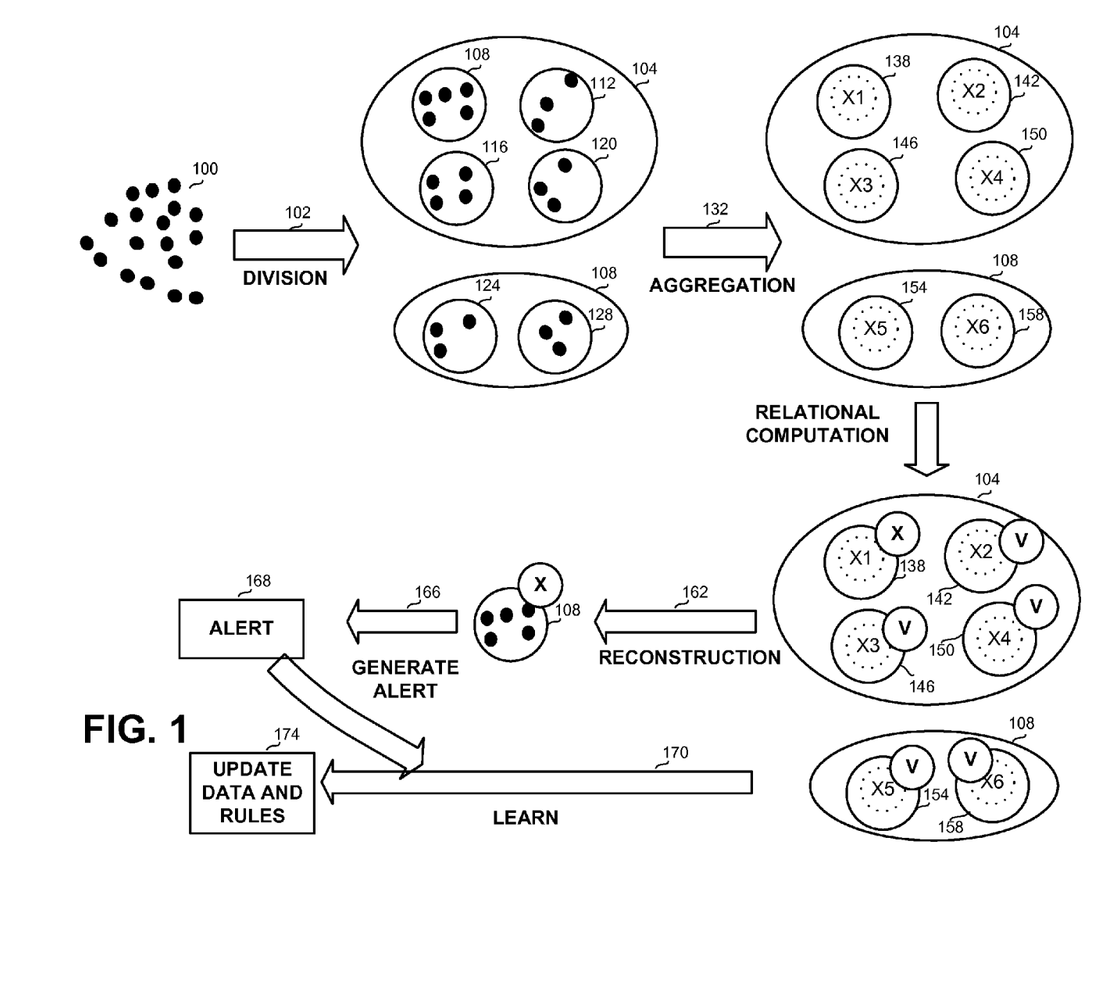
FIG. 1 is a graphic illustrative example of the operation of the attack identification system and method, in accordance with some exemplary embodiments of the disclosed subject matter.

Referring now to FIG. 1, showing a graphic illustrative example of the operation of the system and method.

A set 100 of elements or interactions may be obtained, for example through data collection. The data may be collected by sniffing communication lines, trapping events in one or more computers, monitoring creation, access and modification of files, logging access to internet sites, files, or the like. Data may additionally be collected, for example, by actively sampling resources such as running processes, accessed resources or files, or the like. The interactions may relate to actions such as loading a module, accessing a file, surfing to a web site, changing permissions, or the like. Each action may be associated with relevant data such as action type, user, computer, process, module, or the like, the subject of the action such as file, web site or the like, time or time range if the exact time is not available, or the like.

On step 102 the elements may be divided into groups for example by clustering, in accordance with grouping rules defined by a user, such as IT personnel. Elements may also be divided according to pre-determined similarity, for example, grouping together data from all computers of people who access files in the "Accounting" folder.

For example, the elements may be divided into group 104 associated for example with employees of one organizational unit, and group 108 associated with employees of another organizational unit. Within each organizational unit, elements may be grouped into collections 108, 112, 116 and 120 of group 104, and collections 124 and 128 of group 108, each comprising the relevant elements. In the depicted example, each of collections 108, 112, 116 and 120 may relate to a actions performed by a particular user in the respective organizational unit, and each point within the collection may indicate, for example an access to a certain file by the user. It will be appreciated that elements may belong to more than one group, for example the actions of a person belonging to two units may repeat in two groups.

On step 132, the elements in each collection may be aggregated into a single object, depending on their type and on the aggregation method. The single object may be a number or a property of the objects within. For example, aggregation may be the count of elements in the collection, the sum of elements (if the elements are numeric) divided by the time range, for example the time elapsed between the earliest and latest times associated with the elements in the collection, accumulated time if the elements are associated with a duration, for example duration of surfing in a web site, or the like. In the example of FIG. 1, collections 108, 112, 116, 120, 124 and 128 are aggregated into object $X_1$ (138), object $X_2$ (142), object $X_3$ (146), object $X_4$ (150), object $X_5$ (154), and object $X_6$ (158), respectively.

On step 156, relation computations may be carried out for each single objects, to determine its validity, or adherence with the statistical rules. The output for each collection in the aggregation function may be compared to the others in the same group, for example the same organizational unit. If the output differs by a value which is either predetermined or found during the analysis, the output may be marked as abnormal or suspicious. In some embodiments, the dimension of time may also be introduced, for example the output of a group may be compared to output of the same group or of another group at different time points or ranges. For example, if a user deviates from his group more than the user deviated from his group in the past, this may indicate suspicious behavior. Abnormalities may be determined in accordance with statistical rules, which may describe the significance of the event.

In the example of FIG. 1, object $X_2$ (142), object $X_3$ (146), object $X_4$ (150), object $X_5$ (154), and object $X_6$ (158) adhere with the statistical rules, while object $X_1$ (138) deviates. It will be appreciated that the deviation of $X_1$ (138) may or may not be due to the high number of elements in group 108. The adherence or deviation depends on the contents of the group as well as on the elements. Thus if another criteria or rule is used, different objects may deviate. Even further, if a collection repeats in two groups. For example when an employee is associated with two organizational units, the collection may deviate in one group and be within the norm in the other.

On step 162, the deviating group or groups may be reconstructed or retrieved in order to generate an informative report, or take corrective or preventive actions. Reconstruction step 162 retrieves group 108, and on step 166 an alert 168 may be generated or provided to a user such as a system administrator. The alert may be provided using any communication method, such as popping up a message on a predetermined computer display, sending a short text message or an instant message in a messaging tool, firing an audio or a visual alarm, or the like.

In some embodiments, for example if a deviation from a rule is severe, the system may take preventive or corrective measures, such as blocking a site, disabling an account, halting a process, or the like.

On optional step 170, the system may learn from the gathered data and analysis. For example, averages taken over time may be updated, average usage of a particular resource may be updated, the statistical rules may be updated to match the new information, or the like. The learning results may be used to update rules on step 174. Learning may also be based on reactions of one or more users to alert 168. For example, if responsive to a particular alert a user took extreme measures, the reconstructed situation may be reflected in updated rules as hazardous.

Figure 2A:
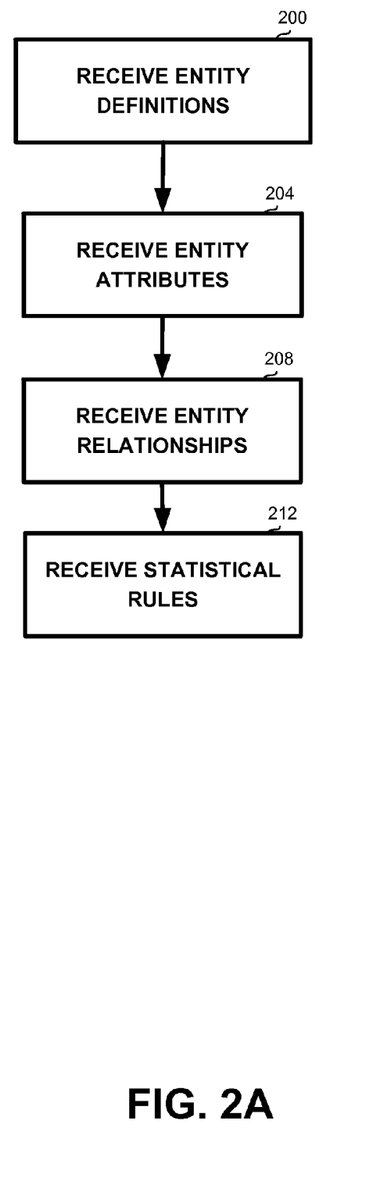
FIG. 2A is a flowchart of steps in a method for defining a system and associated statistical rules used for monitoring activity in the system, in accordance with some exemplary embodiments of the disclosed subject matter.

Referring now to FIG. 2A, showing a flowchart of steps in a method for defining a system and associated statistical rules used for monitoring activity in the system.

On step 200, a user may define or the system may receive definitions of various entities in the system, such as computers, processes, modules, web sites, permissions, users, organizational units, or the like.

On step 204, a user may define or the system may receive attributes for each such entity, such as name, owner, time modified, time created, time last accessed, size, physical location, permissions, location in a hierarchy, or others.

On step 208 the user may define or the system may receive interactions or relationships between the entities, for example a computer executes a process, a process loads a module, a site contains a page, a user belongs to an organizational unit, or the like. It will be appreciated that some relationships may be indirect, for example inheritance of properties, mutual exclusion between objects, or the like. The relationships may be defined automatically. The input for the definition may be described in terms of trees or directed acyclic graphs (DAGs) from which the interactions may be deduced. For example, a computer A running two processes (B and C), each having two modules (D,E and F,G, respectively) may be described as a tree having A at its root, B and C as its descendants, and D, E, F, and G as leaves. The system can deduce that there is a directed path from computer A to each of the modules, and thus deduce the tuples (A,D) (A,E) (A,F) and (A,G).

On step 212 the user may define or the system may receive statistical rules indicating normal or abnormal behaviors or measures. For example, usage of specific modules, usage of specific modules by specific processes, surfing to specific web sites, file downloads, program installations, resource consumption rate, privilege changing, file access characteristics, or others.

As indicated above, the statistical rules may be time-dependent, such that the time at which an event occurred may reflect on the way it is counted or otherwise considered.

It will be appreciated that the definitions order may vary, for example a user may define two entities, attributes thereof and relationship between the entities, and then continue to add attributes for the objects, or to add a third entity.

Figure 2B:
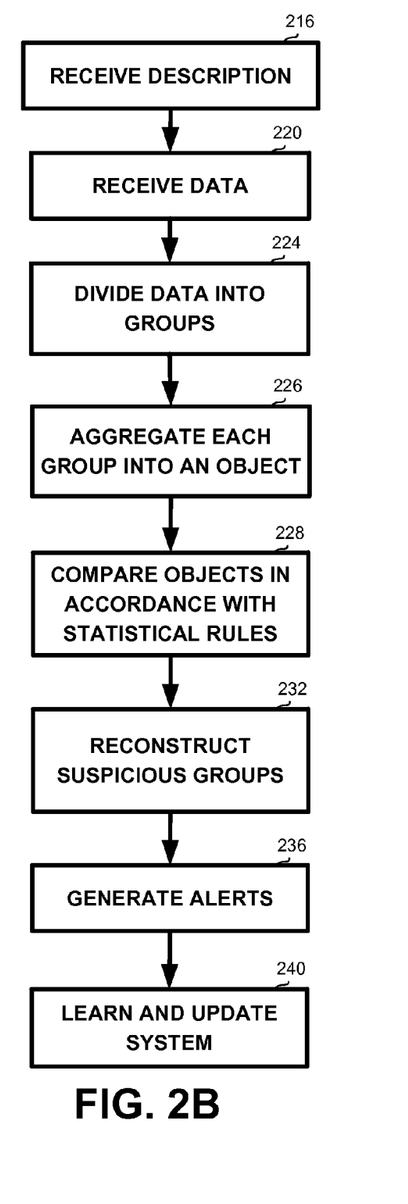
FIG. 2B is a flowchart of steps in a method for monitoring activity in a network, in accordance with some exemplary embodiments of the disclosed subject matter.

Referring now to FIG. 2B, showing a flowchart of steps in a method for monitoring a network.

On step 216, the system may receive the description. The description may be received upon being provided by a user using a corresponding user interface in accordance with FIG. 2A above, loaded from a storage device, deduced partly or fully from an existing system, or the like. The description may include indication of two or more entities, at least one attribute for each entity, and one or more statistical rules related to relationships between two or more of the entities.

On step 220, data, such as actions or occurrence of events for example a process using a module, may be received. The data may be collected for a period of time, which may vary between a few seconds or minutes to prolonged periods, such as a number of months. Data may be collected by sniffing communication channels, monitoring events, monitoring file creation and accesses, or the like. The data may include at least two such events, to provide for grouping the events.

It will be appreciated that the data may be streamed and processed immediately, or gathered and stored, and then processed only when reports of at least a predetermined period or a predetermined quantity of data is gathered.

On step 224, the collected data may be divided or clustered into groups. The groups may be arranged as a collection, as one or more hierarchies, or the like. In some embodiments, one or more data items may be associated with multiple groups.

On step 226 each group may be aggregated into an object, such as a numeric object.

On step 228, the objects may be compared to each other or to predetermined values, in accordance with the statistical rules, to identify events or groups as not complying with the defined rules. In some embodiments, the compliance or non-compliance are not binary, and degrees of compliance may be defined, which may then be displayed or otherwise treated in accordance with the available resources, for example first the highly noncompliant situations are handled, and only then the lesser ones.

On step 232, the groups identified on step 228 as suspicious may be reconstructed or retrieved, and on step 236 an alert may be generated for those groups. The alert may then be issued in any required manner or channel to a person in charge.

Alerts may be generated for each group separately, or to a number of alerts realized within the same time frame. In other alternatives, alerts that relate to common entities may be generated and delivered together, while other alerts may be sent separately.

On optional step 240, the system may update its definitions based on the accumulated data, on the statistics results, or on the reaction of the relevant personnel. For example, if an administrator approved an alert for one or more times as "normal", the rules may be updated so that such events will not be identified as hazardous.

It will be appreciated that monitoring may be a repeating or ongoing process. The process may repeatedly receive and process information related to the network.

Figure 3:
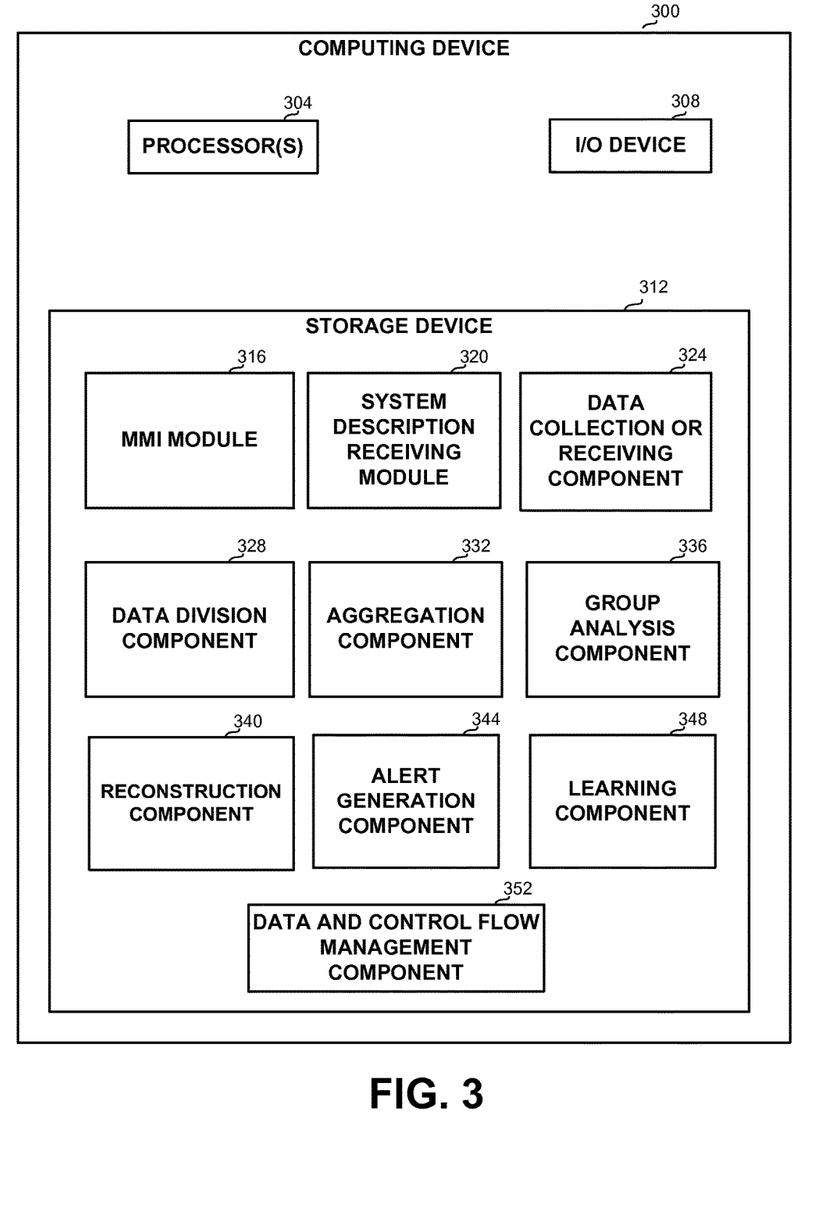
FIG. 3 is a block diagram of components in a computing device for monitoring a network, in accordance with some exemplary embodiments of the disclosed subject matter.

Referring now to FIG. 3, showing a block diagram of components in a computing device for describing and monitoring a computer system.

The system may be implemented as one or more computing devices such as computing device 300, which may comprise one or more processors 304. Any of processors 304 may be a Central Processing Unit (CPU), a microprocessor, an electronic circuit, an Integrated Circuit (IC) or the like. Alternatively, computing device 300 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 304 may be utilized to perform computations required by computing device 300 or any of its subcomponents.

In some embodiments, computing device 300 may comprise or be in communication with one or more input-output (I/O) devices 308 such as a terminal, a display for displaying an image, speakers, a microphone or another audio I/O devices or the like, a keyboard, a touch screen, an I/O device a used for recognizing a person or interacting with the system, or the like.

Computing device 300 may comprise one or more storage devices 312 for storing executable components. Storage device 312 may also contain data during execution of one or more components. Storage device 312 may be persistent or volatile. For example, storage device 312 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 312 may retain program code operative to cause any of processors 304 to perform acts associated with any of the steps shown in FIG. 2A or 2B above, for example receiving a system description, analyzing collected data, or the like.

The components detailed below may be implemented as one or more sets of interrelated computer instructions, executed for example by any of processors 304 or by another processor. The components may be arranged as one or more executable files, dynamic libraries, static libraries, methods, functions, services, or the like, programmed in any programming language and under any computing environment. Storage device 312 may comprise or be loaded with one or more of the components, which can be executed on computing platform 300 by any one or more of processors 304. Alternatively, any of the executable components may be executed on any other computing device which may be in direct or indirect communication with computing platform 300.

Storage device 312 may comprise man machine interface (MMI) module 316 for enabling a user to enter description of the system, receive results such as alerts or reports about ongoing activity, or the like. MMI module 316 may receive or display data using any of I/O devices 308, or on an I/O device associated with a different computing platform. MMI module 316 may also be provided as a web service executed by one computing platform and providing client functionality on another.

Storage device 312 may also comprise system description receiving module 320, for receiving system description from a user, including entities, attributes, relationships, or the like. The description may be received from MMI module 316, loaded from another memory device, or the like.

Yet another component loaded to or stored on storage device 312 may be data collection or receiving component 324 for collecting activity data from the computing system. The data may be streamed and processed immediately, or stored and processed only when a significant quantity of reports is gathered. Alternatively, the data may be collected by another component or system and may be received by data collection or receiving component 324.

Storage device 312 may comprise data division component 328 for distributing, clustering or otherwise dividing the data into groups, wherein the groups may be arranged as a collection, as a group hierarchy, or the like.

Storage device 312 may also comprise aggregation component 332, for aggregating the data in each group into a single object, whether numeric or of another type.

Storage device 312 may further comprise group analysis component 336 for analyzing the single object created for each group, and determining whether the object complies with the statistical rules or not. The determination can be absolute, using only predetermined data and rules, or relative to other groups.

Storage device 312 may also comprise reconstruction component 340, for reconstructing the data in each group which was determined as not complying with the statistical rules and therefore representing some hazard. In some embodiments, reconstruction component 340 may also be used for reconstructing groups which do comply with the statistical rules, either for purposes such as quality assurance, training, or the like.

Storage device 312 may comprise alert generation component 344 for generating and optionally sending alerts related for example to groups associated with some suspicion level. Alerts may be collected and sent together, separately, or any combination thereof. For example, alerts related to a common entity or related to the same time frame may be sent together.

Storage device 312 may also comprise learning component 348 for learning new or updated data, such as updated probabilities or distribution of events. Learning may be done from the collected data, from personnel reactions to alerts, or the like.

Storage device 312 may further comprise data and control flow management component 352 for managing the flow of the processes and data, activating other components and providing the required data, or the like.

The disclosed system and method provides for describing a system and monitoring the system to analyze suspicious behaviors. Unlike prior art systems, in which the rules are fixed and an action is either permitted or prohibited, the current disclosure relates to utilizing probabilities and raising an alert if an action is performed more or less frequently than expected, more or less frequently than a predetermined threshold, more or less frequently than by other users or systems, or the like. For example, assuming root privileges may be assigned a probability for being suspicious, e.g., the probability of such action to be associated with illegitimate activity is 5% on average. However, some users, such as system administrators perform root actions frequently and hence the probability that the pair consisting of the user and the action is suspect can be 1%, whereas a different user such as a data entry user can be suspected with probability of 90%. The disclosure also provides for utilizing and evaluating trends, such that the same events may be treated differently at different times.

It will be appreciated that the usage of probabilities allows for easy computation of complex interactions between a wide range of entities related directly or indirectly, and hence allows for analysis of more complex security situations. By allowing the specification of base level probabilities for actions and users, processes or other entities, a larger range of potential security-related interactions may be identified than is feasible to explicitly enumerate.

It will be appreciated that the probability of independent events is generally the product of their probabilities. However, correlations and dependence may exist between events which may be hard to define, but it may be required to handle potential correlation between events. In order to define how two events are correlated, the disclosed method and apparatus may use any one or both of the following options: (a) An administrator may explicitly state that certain rules or certain groups of events are correlated, for example abnormal usage time of a computer by a user and an abnormal usage time of the user accessing the web; and (b) The system may determine correlation between events and the generated alerts (such as, record the number of times a single data phase, or related collected data end up generating alerts).

It will be appreciated that the disclosed components are exemplary only and multiple other components may be used in addition to or instead of the disclosed ones. For example, components may be used which provide communication with external systems or with external storage devices, raise alerts, provide different services, components for playing text (text to speech), or otherwise communicate data or questions to a user, or the like.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like, conventional procedural programming languages, such as the "C" programming language or similar programming languages, scripting languages such as Perl, Python, Ruby, or any other programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device having a processor, the method comprising:
    receiving a description of a computerized system, the description comprising indication of at least two entities, at least one attribute for each of the at least two entities and at least one statistical rule related to relationships between the at least two entities;
    receiving data to be automatically analyzed related to monitored activity of the computerized system, the data comprising events containing at least an event related to an attack attempt and an event not related to an attack attempt;
    grouping the events into at least two groups associated with the at least two entities;
    classifying each entity by determining a probability of each entity being associated with the events within the data, and classifying the events based on when they occurred;
    aggregating each group into at least two objects based on the classifications;
    comparing the at least two objects to predetermined values which are based on at least one statistical rule, to identify a group from which an object was aggregated as not complying with the at least one statistical rule, wherein the non-compliance is not binary and degrees of non-compliance exist, wherein the non-compliant group may be identified as containing the event related to the attack attempt;
    displaying or otherwise treating a plurality of events related to an attack attempt in order of their degree of non-compliance, identified via the steps of receiving the description, receiving the data, grouping, classifying, aggregating and comparing; and
    wherein said receiving the description, receiving the data, groupings of classifying, comparing, and displaying or otherwise treating is performed by the processor.

2. The computer-implemented method of claim 1, further comprising generating an alert related to the group not complying with the at least one statistical rule.

3. The computer-implemented method of claim 2, further comprising issuing the alert to a person in charge.

4. The computer-implemented method of claim 2, further comprising updating the description of the computerized system based on a reaction of an operator to the alert.

5. The computer-implemented method of claim 1, further comprising reconstructing the group not complying with the at least one statistical rule.

6. The computer-implemented method of claim 1 further comprising, aggregating a first group of the at least two groups to obtain a first object and aggregating a second group of the at least two groups to obtain a second object, and wherein comparing the at least two groups comprises comparing first object to the second object.

7. The computer-implemented method of claim 6, wherein aggregating any of the least two groups comprises an option selected from the group consisting of: counting items; averaging items; dividing an object sum by accumulated time; and dividing an object sum by time range.

8. The computer-implemented method of claim 1, further comprising a learning component for learning the data and updating the description of the computerized system based on the data.

9. The computer-implemented method of claim 1, further comprising:
    receiving definition of the least two entities;
    receiving at least one attribute for each of the at least two entities;
    receiving at least one relationship between the at least two entities; and
    receiving at least one statistical rule related to the relationship.

10. The computer-implemented method of claim 1, wherein each of the at least two entities is selected from a group consisting of: a computer; an application; a process; a module; a user; an organizational unit; and a web site.

11. The computer-implemented method of claim 1, wherein comparing the at least two groups is unrelated to event order.

12. The computer-implemented method of claim 1, wherein the relationships between the at least two entities are implemented as trees or directed acyclic graphs.

13. An apparatus having a processor and a storage device, the processor being adapted to perform the steps of:
    receiving a description of a computerized system, the description comprising indication of at least two entities, at least one attribute for each of the at least two entities and at least one statistical rule related to relationships between the at least two entities;
    receiving data to be analyzed related to monitored activity of the computerized system, the data comprising at least an event related to an attack attempt an and event not related to an attack attempt;
    grouping the events into at least two groups associated with the at least two entities, then aggregating each group into an object;
    classifying each entity by determining a probability of each entity being associated with the events within the data, and classifying the events based on when they occurred;
    aggregating each of the at least two groups to obtain at least two objects based on the classifications;
    comparing the at least two objects to predetermined values which are based on at least one statistical rule, to identify a group from which an object was aggregated as not complying with the at least one statistical rule, wherein the non-compliance is not binary and degrees of non-compliance exist, wherein the non-compliant group comprises the event related to the attack attempt; and
    displaying or otherwise treating a plurality of events related to an attack attempt in order of their degree of non-compliance, identified via the steps of receiving the description, receiving the data, grouping, classifying, aggregating and comparing.

14. The apparatus of claim 13, wherein the processor is further adapted for generating an alert related to the group not complying with the at least one statistical rule.

15. The apparatus of claim 13, wherein the processor is further adapted for reconstructing the group not complying with the at least one statistical rule.

16. The apparatus of claim 13, wherein the processor is further adapted for learning the data and updating the description of the computerized system based on the data.

17. The apparatus of claim 16, wherein the processor is further adapted for generating an alert related to the group not complying with the at least one statistical rule, and wherein the description is updated based on a reaction of an operator to the alert.

18. The apparatus of claim 13, wherein the processor is further adapted for:
receiving definition of the at least two entities;
receiving at least one attribute for each of the at least two entities;
receiving at least one relationship between the at least two entities; and
receiving at least one statistical rule related to the relationship.

19. The apparatus of claim 13, wherein each of the at least two entities is selected from the group consisting of: a computer; an application; a process; a module; a user; an organizational unit; and a web site.

20. The apparatus of claim 13, wherein comparing the at least two groups is unrelated to event order within one of the at least two groups.

21. The apparatus of claim 13, wherein the relationships between the at least two entities are implemented as trees or directed acyclic graphs.

22. A computer program product comprising: a non-transitory computer readable medium;
a first program instruction for receiving a description of a computerized system, the description comprising indication of at least two entities, at least one attribute for each of the at least two entities and at least one statistical rule related to relationships between the at least two entities;
a second program instruction for receiving data to be analyzed related to monitored activity of the computerized system, the data comprising at least an event related to an attack attempt and an event not related to an attack attempt;
a third program instruction for grouping the events into at least two groups associated with the at least two entities,
a fourth program instruction for classifying each entity by determining a probability of an entity being associated with the events within the data, and classifying the events based on when they occurred;
a fifth program instruction for aggregating each group into at least two objects based on the classifications; and
a sixth program instruction for comparing the at least two objects to predetermined values which are based on at least one statistical rule, to identify a group from which an object was aggregated as not complying with the at least one statistical rule, wherein the non-compliance is not binary and degrees of non-compliance exist, wherein the non-compliant group may be identified as containing the event related to the attack attempt;
a seventh program instruction for displaying or otherwise treating a plurality of events related to an attack attempt according to their degree of non-compliance, identified via the instructions for receiving the description, receiving the data, grouping, aggregating and comparing;
wherein said first, second, third, fourth, fifth, sixth, and seventh program instructions are stored on said non-transitory computer readable medium and executed on a computing device.

23. The computer program product of claim 22, wherein the relationships between the at least two entities are implemented as trees or directed acyclic graphs.

* * * * *